Patented June 8, 1937

2,083,225

UNITED STATES PATENT OFFICE 2,083,225

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application February 15, 1937, Serial No. 125,832

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings."

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by my process consists of or comprises an alkylated naphthalene sulfonic acid in the form of a polyamine salt of the kind in which at least one alkyl group substituted in the naphthalene nucleus contains not less than three carbon atoms and not more than 10 carbon atoms, and the salt-forming amine is characterized by being of the type formula:

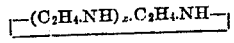

where $x$ is a whole number greater than one and less than 20.

Amines of the kind described are obtained in various manners, and particularly by the interaction of ethylene dichloride with ammonia, followed by liberation of the free amine by treatment with caustic soda or the like.

Commercial demulsifying agents employed for breaking or resolving oil field emulsions include, among other substances, substituted polycyclic aromatic sulfonic acids or their salts. The type which finds most frequent application is obtained by introducing one, two or more alkyl groups into a naphthalene residue and then producing the sulfonic acids; or else, by the equivalent procedure of alkylating the sulfonic acids. Due to the corrosiveness of the sulfonic acid, it is the usual practice to employ the reagent in the form of a salt, such as ammonium salt, potassium salt, sodium salt, etc.

I have found that if alkylated polycyclic aromatic sulfonic acids of the kind previously described are neutralized by means of triethylene triamine, tetraethylene tetramine, pentaethylene pentamine, and homologues or isologues of the same, one obtains a treating agent or demulsifying agent of unusual effectiveness.

There does not appear to be any suitable explanation of this unusual superiority, and similarly, there does not seem to be any basis by which one could anticipate or foresee this unusual effectiveness. Apparently, this marked improvement is not directly related to oil or water solubility, insofar that similar neutralization with other amines may yield compounds which have a greater solubility in oily materials or in water, and yet are not nearly as suitable and not nearly as effective in their demulsifying action.

Apparently, there is some unlooked-for cooperation or chemical or physico-chemical relationship between the polyamine residue of the kind previously described and the sulfo-aromatic polycyclic residue. The neutralization of other conventional acidic demulsifying reagents with the amine of the kind previously described does not seem to produce any marked improvement over the corresponding sodium or ammonium salts, and in many cases, yields an inferior product, thus indicating that apparently the increased value does not reside in an additive effect, due to the amine residue of the kind previously described. If one neutralizes other sulfonic acids, which are known to be effective demulsifying agents, such as petroleum sulfonic acids of the mahogany acid type, with an amine of the kind previously described, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the polyamine residue of the kind previously described and the described sulfo-aromatic polycyclic residue in a single molecule, results in an unlooked-for, unique quality, which could not be foreseen by the present knowledge of the art, and which produces a demulsifying agent that is particularly effective for a large number of emulsified crude oils.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily perhaps as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the demulsifying agent contemplated by my process, consists in converting the naphthalene into either the alpha or beta naphthalene sulfonic acid, or a mixture of both, or in some instances, into a di- or even tri-sulfonic acid, or a mixture of all the various types. In most instances there is no advantage in introducing more than one sulfonic acid group. In many instances it is unnecessary to use particular care to prepare either only the alpha sulfonic acid, or either only the beta sulfonic acid, because a mixture in which either one or the other predominates, or a mixture in which the alpha and beta sulfonic acids are present, is just as satisfactory as one sulfonic acid completely freed from the other type.

The alcohols employed, such as propyl alcohols, butyl alcohols, amyl alcohols, hexyl alcohols, decyl alcohols, etc. are converted into the acid sulfate, such as propyl hydrogen sulfate, etc. The naphthalene sulfonic acid and the alkyl hydrogen sulfate are combined in proportions so that one, two, three, or even four alkyl groups are introduced into the polycyclic aromatic residue. This condensation reaction is generally carried out in the presence of an excess of sulfuric acid. In some instances, the various reactions, such as sulfonation, sulfation, condensation, etc. are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the polycyclic aromatic nucleus, one could also introduce an alkyl residue from some other alcohol, as, for example, an alkylated group derived from ethyl or methyl alcohol, or one might introduce a group derived from various alcohols such as aryl, aralkyl, cyclic, hydro-aromatic alcohols, etc., but regardless of whether or not one introduces such other residues, it is necessary that at least one alkyl residue of the kind described, i. e., having at least three carbon atoms and not more than ten carbon atoms, be introduced into the naphthalene ring. Such compounds having some other substituent present, such as a methyl substituent, might be considered as being derived from methyl naphthalene instead of naphthalene, and thus, would fall within the class of chemical types or equivalents previously noted. It is immaterial as to the particular alcohol employed, or the particular isomeric form of the alcohol employed, although generally speaking, it is most desirable to use the one lowest in cost. It is immaterial whether one uses normal propyl alcohol, or iso-propyl alcohol. It is immaterial whether one uses a normal butyl or isobutyl alcohol. It is immaterial whether the alcohol is a primary alcohol, or a secondary alcohol, or a tertiary alcohol, or the like.

It is obvious that a large number of isomers can be produced in the manufacture of the reagent employed in the present process. For instance, although the sulfonic group may be introduced into either the alpha or beta position, or a mixture of both, it is manifest that the alkyl group or groups can be introduced into various positions in regard to the position of the sulfonic acid group. Apparently, as far as I am aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is my preference to produce the reagents from these alcohols, and in some instances, it is desirable to introduce different alkyl groups, such as a propyl group and butyl group, into the same sulfo-naphthalene residue.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with an amine product of the kind previously described in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that I prefer to use in practicing my process is obtained by a reaction in which three moles of propyl alcohol are reacted with one mole of naphthalene by the customary sulfation, sulfonation and condensation reactions. The resulting mixture consists largely of di-propyl naphthalene sulfonic acids and tri-propyl naphthalene sulfonic acids, with possibly small amounts of mono-propyl sulfonic acids and tetra-propyl sulfonic acids, and perhaps some di-sulfonic acids present. Generally speaking, it is easier to conduct the reaction so that the bulk of the sulfonic acid represents the beta type, although the alpha type may be produced, if desired. The product is neutralized with triethylene triamine and is diluted with one or more solvents, so as to reduce its viscosity to that of ordinary castor oil, or slightly greater. The solvent which I preferably employ is a mixture of two or more of the following: water, denatured alcohol, kerosene, or tar acid oil.

Triethylene triamine may be indicated more conveniently by the following formula:

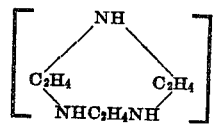

Among the reagents which are particularly effective are the salts of the polyamines of the kind previously described, of the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl-di-normal butyl naphthalene sulfonic acids, di-isopropyl-di-normal butyl naphthalene sulfonic acids, di-isopropyl-mono-amyl naphthalene sulfonic acids, mono-isopropyl-mono-hexyl naphthalene sulfonic acids, etc.

In such instances where there is present more than one sulfonic acid group, as in the formation of di-sulfonic acids, or tri-sulfonic acids, if desired, all the sulfonic acid hydrogens may be neutralized with an amine of the kind previously described, or, if desired, only one sulfonic acid hydrogen may be neutralized with an amine of the kind previously described, and the other sulfonic acid hydrogen atom or atoms may be neutralized with some other suitable base, such as sodium hydroxide, potassium hydroxide, ammonium hydroxide, etc.

Salts of the polyamines of the kind previously described, such as the hydrochloride, may react by double decomposition with alkali surfonates in a suitable medium to produce the sulfonate of the amine of the kind previously described.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than an amine of the kind previously described, or the like.

It is obvious that polyamines analogous to triethylene triamine or tetraethylene tetramine, may be obtained by reactions involving alkylene dichlorides other than ethylene dichloride. For instance, propylene dichloride, butylene dichloride, and amylene dichloride, can be treated with ammonia in a similar fashion so as to yield polyamines similar to those described above. For this reason, the type of amine which may be employed may be represented more broadly by the following type of formula:

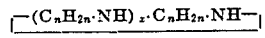

where $n$ represents the numeral 2, 3, 4, or 5, and $x$ is a whole number greater than one and less than 20.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practicing my process, a treating agent or demulsifying agent of the kind above described is brought into contact with or caused to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification.

Having thus described my invention, what I claim as new and desire to secure by Letters Patent is:

1. A process for breaking petroleum emulsions of the water-in-oil type, which consists in subjecting the emulsion to the action of a demulsifying agent comprising a polyamine salt of an alkylated naphthalene sulfonic acid in which at least one alkyl group substituted in the naphthalene nucleus contains at least three carbon atoms and not more than ten carbon atoms, the salt-forming amine being of the kind characterized by the type formula:

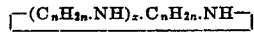

in which $n$ represents the numeral 2, 3, 4, or 5, and $x$ is a whole number greater than one and less than 20.

2. A process for breaking petroleum emulsions of the water-in-oil type, which consists in subjecting the emulsion to the action of a demulsifying agent comprising a polyamine salt of an alkylated naphthalene sulfonic acid in which at least one alkyl group substituted in the naphthalene nucleus contains at least three carbon atoms and not more than ten carbon atoms, the salt-forming amine being of the kind characterized by the type formula:

$$[-(C_2H_4.NH)_x.C_2H_4.NH-]$$

wherein $x$ is a whole number greater than one and less than 20.

3. A process for breaking petroleum emulsions of the water-in-oil type, which consists in subjecting the emulsion to the action of a demulsifying agent comprising a polyamine salt of an amylated naphthalene sulfonic acid, the salt-forming amine being of the kind characterized by the type formula:

$$[-(C_2H_4.NH)_x.C_2H_4.NH-]$$

wherein $x$ is a whole number greater than one and less than 20.

4. A process for breaking petroleum emulsions of the water-in-oil type, which consists in subjecting the emulsion to the action of a demulsifying agent comprising a polyamine salt of a butylated naphthalene sulfonic acid, the salt-forming amine being of the kind characterized by the type formula:

$$[-(C_2H_4.NH)_x.C_2H_4.NH-]$$

wherein $x$ is a whole number greater than one and less than 20.

5. A process for breaking petroleum emulsions of the water-in-oil type, which consists in subjecting the emulsion to the action of a demulsifying agent comprising a polyamine salt of a propylated naphthalene sulfonic acid, the salt-forming amine being of the kind characterized by the type formula:

$$[-(C_2H_4.NH)_x.C_2H_4.NH-]$$

wherein $x$ is a whole number greater than one and less than 20.

6. A process for breaking petroleum emulsions of the water-in-oil type, which consists in subjecting the emulsion to the action of a demulsifying agent comprising a polyamine salt of a propylated naphthalene mono-sulfonic acid, the salt-forming amine being of the kind characterized by the type formula:

$$[-(C_2H_4.NH)_x.C_2H_4.NH-]$$

wherein $x$ is a whole number greater than one and less than 20.

7. A process for breaking petroleum emulsions of the water-in-oil type, which consists in subjecting the emulsion to the action of a demulsifying agent comprising a triethylene triamine salt of propylated naphthalene mono-sulfonic acid.

8. A process for breaking petroleum emulsions of the water-in-oil type, which consists in subjecting the emulsion to the action of a demulsifying agent comprising a triethylene triamine salt of propylated naphthalene mono-sulfonic acid admixed with a suitable solvent.

9. A process for breaking petroleum emulsions of the water-in-oil type, which consists in subjecting the emulsion to the action of a demulsifying agent obtained by converting naphthalene into the mono-sulfonic acid, converting propyl alcohol into the acid sulfate, combining said materials in molecular proportions in presence of sulfuric acid as a condensing agent, followed by the conventional washing process and separation of the aqueous waste acid, and neutralization of the sulfonic acid, by means of triethylene triamine, followed by addition of a suitable solvent.

MELVIN DE GROOTE.